United States Patent
Ranta

(10) Patent No.: US 7,150,028 B1
(45) Date of Patent: Dec. 12, 2006

(54) METHOD AND SYSTEM FOR DOWNLOADING, STORING AND DISPLAYING COUPON DATA USING THE HORIZONTAL OVERSCAN PORTION OF A VIDEO SIGNAL

(75) Inventor: Craig S. Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/476,291

(22) Filed: Dec. 30, 1999

(51) Int. Cl.
*H04N 7/16* (2006.01)
*H04N 7/00* (2006.01)

(52) U.S. Cl. .................. 725/23; 348/476; 348/479

(58) Field of Classification Search ............... 725/23, 725/20, 134, 136, 3, 5, 6; 705/14; 348/460, 348/477–479, 476; 726/9, 20
See application file for complete search history.

(56) References Cited

U.S. PATENT DOCUMENTS

| | | | |
|---|---|---|---|
| 3,493,674 A | 2/1970 | Houghton | |
| 3,743,767 A | 7/1973 | Bitzer | |
| 3,848,082 A * | 11/1974 | Summers | 348/473 |
| 3,891,792 A | 6/1975 | Kimura | |
| 3,900,887 A | 8/1975 | Soga | |
| 3,993,861 A | 11/1976 | Baer | |
| 4,186,413 A | 1/1980 | Mortimer | 358/146 |
| 4,207,704 A | 6/1980 | Akiyama | |
| 4,368,486 A | 1/1983 | Degoulet et al. | 358/146 |
| 4,540,176 A | 9/1985 | Baer | 273/148 |
| 4,599,644 A | 7/1986 | Fischer | |
| 4,638,359 A | 1/1987 | Watson | 358/147 |
| 4,660,033 A | 4/1987 | Brandt | 340/825 |
| 4,665,431 A | 5/1987 | Cooper | 358/145 |
| 4,729,563 A | 3/1988 | Yokoi | 273/1 |
| 4,771,344 A | 9/1988 | Fallacaro et al. | 358/335 |
| 4,807,031 A | 2/1989 | Broughton et al. | |
| 4,840,602 A | 6/1989 | Rose | 446/175 |
| 4,846,693 A | 7/1989 | Baer | |

(Continued)

FOREIGN PATENT DOCUMENTS

EP  93 23955 A  11/1993

(Continued)

OTHER PUBLICATIONS

George D. Summers, The Data Dot System, , Signal, Jan. 1975.*

(Continued)

*Primary Examiner*—Chris Kelley
*Assistant Examiner*—Michael Van Handel
(74) *Attorney, Agent, or Firm*—Ronald M. Anderson

(57) ABSTRACT

A method and system for decoding and storing encoded coupon data delivered via the horizontal overscan area of a video signal. An electronic coupon displays representations of coupons defined by coupon data that can be extracted from an encoded video signal that can be broadcast or played-back from video tape. The electronic coupon is equipped with a non-volatile memory that permits the coupon data to be stored for display subsequent to the transmission session (e.g., a televised program). The electronic coupon has a set-up mode which allows a user to pre-select types of coupons that the user would like to receive. Coupon data satisfying the user's selections will be stored in the electronic coupon, while coupon data not satisfying the user's selections will not be stored. A decoder extracts the coupon data from an encoded video signal and transmits the coupon data to the electronic coupon via a receiver of electronic contacts. Advantageously, the coupon data can be transmitted to the electronic coupon during television commercials.

29 Claims, 4 Drawing Sheets

U.S. PATENT DOCUMENTS

| | | | |
|---|---|---|---|
| 4,847,699 A | 7/1989 | Freeman | |
| 4,847,700 A | 7/1989 | Freeman | |
| 4,855,827 A | 8/1989 | Best | 358/143 |
| 4,862,268 A | 8/1989 | Campbell et al. | 358/141 |
| 4,864,607 A | 9/1989 | Mitamura et al. | 379/388 |
| 4,930,019 A | 5/1990 | Chu | 358/335 |
| 4,949,327 A | 8/1990 | Forsse et al. | 369/58 |
| 4,969,041 A | 11/1990 | O'Grady et al. | 358/142 |
| 5,021,878 A | 6/1991 | Lang | |
| 5,108,341 A | 4/1992 | Desmet | |
| 5,128,752 A * | 7/1992 | Von Kohorn | 705/10 |
| 5,198,893 A | 3/1993 | Lang | 358/93 |
| 5,243,423 A | 9/1993 | DeJean | 358/142 |
| 5,249,044 A * | 9/1993 | Von Kohorn | 725/23 |
| 5,255,097 A | 10/1993 | Spiero et al. | 358/181 |
| 5,270,480 A | 12/1993 | Hikawa | |
| 5,285,278 A * | 2/1994 | Holman | 725/23 |
| 5,287,181 A * | 2/1994 | Holman | 348/473 |
| 5,371,545 A | 12/1994 | Tults | 348/465 |
| 5,398,071 A | 3/1995 | Gove et al. | 348/558 |
| 5,402,419 A | 3/1995 | Osakabe et al. | 370/85.1 |
| 5,450,134 A | 9/1995 | Legate | 348/467 |
| 5,453,794 A | 9/1995 | Ezaki | 348/461 |
| 5,453,795 A | 9/1995 | Tults | 348/465 |
| 5,463,423 A | 10/1995 | Tults | 348/465 |
| 5,483,289 A | 1/1996 | Urade et al. | 348/468 |
| 5,500,681 A * | 3/1996 | Jones | 348/473 |
| 5,504,519 A * | 4/1996 | Remillard | 725/10 |
| 5,515,270 A * | 5/1996 | Weinblatt | 705/14 |
| 5,523,794 A * | 6/1996 | Mankovitz et al. | 705/14 |
| 5,534,911 A * | 7/1996 | Levitan | 725/46 |
| 5,561,469 A | 10/1996 | Schultz | 348/476 |
| 5,594,493 A * | 1/1997 | Nemirofsky | 725/23 |
| 5,604,542 A * | 2/1997 | Dedrick | 348/552 |
| 5,629,738 A | 5/1997 | Kim | 348/465 |
| 5,655,945 A | 8/1997 | Jani | |
| 5,703,658 A | 12/1997 | Tsuru et al. | 348/554 |
| 5,752,880 A | 5/1998 | Gabai et al. | 463/1 |
| 5,767,896 A * | 6/1998 | Nemirofsky | 725/23 |
| 5,808,689 A * | 9/1998 | Small | 348/476 |
| 5,812,207 A | 9/1998 | Cahill, III | 348/465 |
| 5,880,769 A * | 3/1999 | Nemirofsky et al. | 725/139 |
| 5,907,350 A * | 5/1999 | Nemirofsky | 725/23 |
| 5,907,793 A * | 5/1999 | Reams | 725/122 |
| 5,953,047 A * | 9/1999 | Nemirofsky | 725/23 |
| 5,977,951 A | 11/1999 | Danieli et al. | 345/156 |
| 5,978,013 A * | 11/1999 | Jones et al. | 725/23 |
| 6,005,632 A | 12/1999 | Cahill, III | 348/465 |
| 6,052,755 A * | 4/2000 | Terrill et al. | 711/103 |
| 6,057,872 A * | 5/2000 | Candelore | 725/23 |
| 6,057,889 A | 5/2000 | Reitmeier et al. | 348/555 |
| 6,072,532 A | 6/2000 | Chieh et al. | 348/478 |
| 6,075,971 A * | 6/2000 | Williams et al. | 725/23 |
| 6,229,572 B1 | 5/2001 | Ciardullo et al. | 348/473 |
| 6,237,145 B1 * | 5/2001 | Narasimhan et al. | 725/23 |
| 6,281,939 B1 | 8/2001 | Del Castillo et al. | 348/558 |
| 6,282,713 B1 * | 8/2001 | Kitsukawa et al. | 725/36 |
| 6,321,208 B1 * | 11/2001 | Barnett et al. | 705/14 |
| 6,377,308 B1 | 4/2002 | Cahill, III | 348/461 |
| 6,415,439 B1 | 7/2002 | Randell et al. | 725/153 |
| 2006/0015893 A1 * | 1/2006 | Kiysukawa et al. | 725/23 |

FOREIGN PATENT DOCUMENTS

| | | |
|---|---|---|
| EP | 94 24820 A | 10/1994 |
| EP | 0710022 A2 | 5/1996 |
| EP | 0788279 | 8/1997 |
| EP | 99 00979 A | 1/1999 |
| WO | WO 91/10490 | 7/1991 |
| WO | WO 92/19073 | 10/1992 |
| WO | WO 93/18614 | 9/1993 |
| WO | WO 00/44460 | 8/2000 |

OTHER PUBLICATIONS

Koplar Interactive Systems Website: www.k-isi.com/valuecard.html.

* cited by examiner

METHOD AND SYSTEM FOR DOWNLOADING, STORING AND DISPLAYING COUPON DATA USING THE HORIZONTAL OVERSCAN PORTION OF A VIDEO SIGNAL

TECHNICAL FIELD

The present invention relates to data communication systems and, more particularly, relates to encoding coupon data in the horizontal overscan portion of a video signal and storing the data within an electronic coupon for subsequent redemption.

BACKGROUND OF THE INVENTION

Coupons have traditionally been printed on paper and distributed to targeted consumers. Manufacturers produce and distribute over $380 billion worth of grocery coupons annually. In 1998, however, only about $3.6 billion worth of coupons were redeemed. Obviously, consumers are receiving coupons that they do not wish to redeem. Research indicates that most supermarket consumers find it very difficult to locate grocery coupons for all of the products that they purchase regularly. Thus, there is a need for a more efficient means for distributing coupons to consumers. If coupons can be more accurately targeted to consumers that are likely to redeem the coupons, then less money will be spent on printing and distributing coupons that are often thrown away.

Various attempts have been made to deliver coupons to a more directly targeted group of consumers. Some companies have made coupons available on the Internet, so that consumers can select coupons for printing and redeeming. However, this approach is only effective for reaching consumers who own a computer with Internet access and are willing to take the time to seek the coupons that they desire. Moreover, this approach is susceptible to fraud, because it is difficult to prevent consumers from printing and redeeming unlimited amounts of coupons for fraudulent purposes. In addition, the end result is still a paper coupon which must be handled and redeemed in the conventional manner, with resultant waste of paper and the burden of coupon sorting resting on the merchant.

Therefore, there is a need for a coupon distribution system that provides widespread coupon distribution, while permitting consumers to choose which coupons they receive.

SUMMARY OF THE INVENTION

The present invention meets the needs described above by providing a method and system for downloading and redeeming coupon data that has been encoded in the horizontal overscan portion of a video signal. An electronic coupon displays representations of coupons defined by coupon data that can be extracted from an encoded video signal that can be broadcast or played-back from video tape. The electronic coupon is equipped with a non-volatile memory that permits the coupon data to be stored for display subsequent to the transmission session (e.g., a televised program). The electronic coupon has a set-up mode which allows a user to pre-select types of coupons that the user would like to receive. Coupon data satisfying the user's selections will be stored in the electronic coupon, while coupon data not satisfying the user's selections will not be stored. A decoder extracts the coupon data from an encoded video signal and transmits the coupon data to the electronic coupon via a receiver of electronic contacts.

In one aspect of the invention, a system is provided for delivering and storing coupon data using the horizontal overscan portion of a video signal. The system includes a decoder that extracts coupon data from the horizontal overscan portion of a video signal during a transmission session, such as a television program or a video taped program. The system also includes an electronic coupon that can display a coupon representation defined by the coupon data. The electronic coupon has a non-volatile memory that receives the coupon data during the transmission session and stores the coupon data for display by the electronic coupon after the transmission session ends. The electronic coupon also has a controller that retrieves the coupon data from the non-volatile memory and causes the electronic coupon to display the coupon representation.

In another aspect of the invention, a method is provided for delivering and storing coupon data for an electronic coupon using the horizontal overscan portion of a video signal. The video signal is received during a transmission session. The coupon data is extracted from the horizontal overscan portion of the video signal and a coupon representation defined by the coupon data is displayed after the transmission session ends.

That the invention improves over the drawbacks of the prior art and accomplishes these advantages will become apparent from the following detailed description of the exemplary embodiments and the appended drawings and claims.

DETAILED DESCRIPTION

Figure 1:
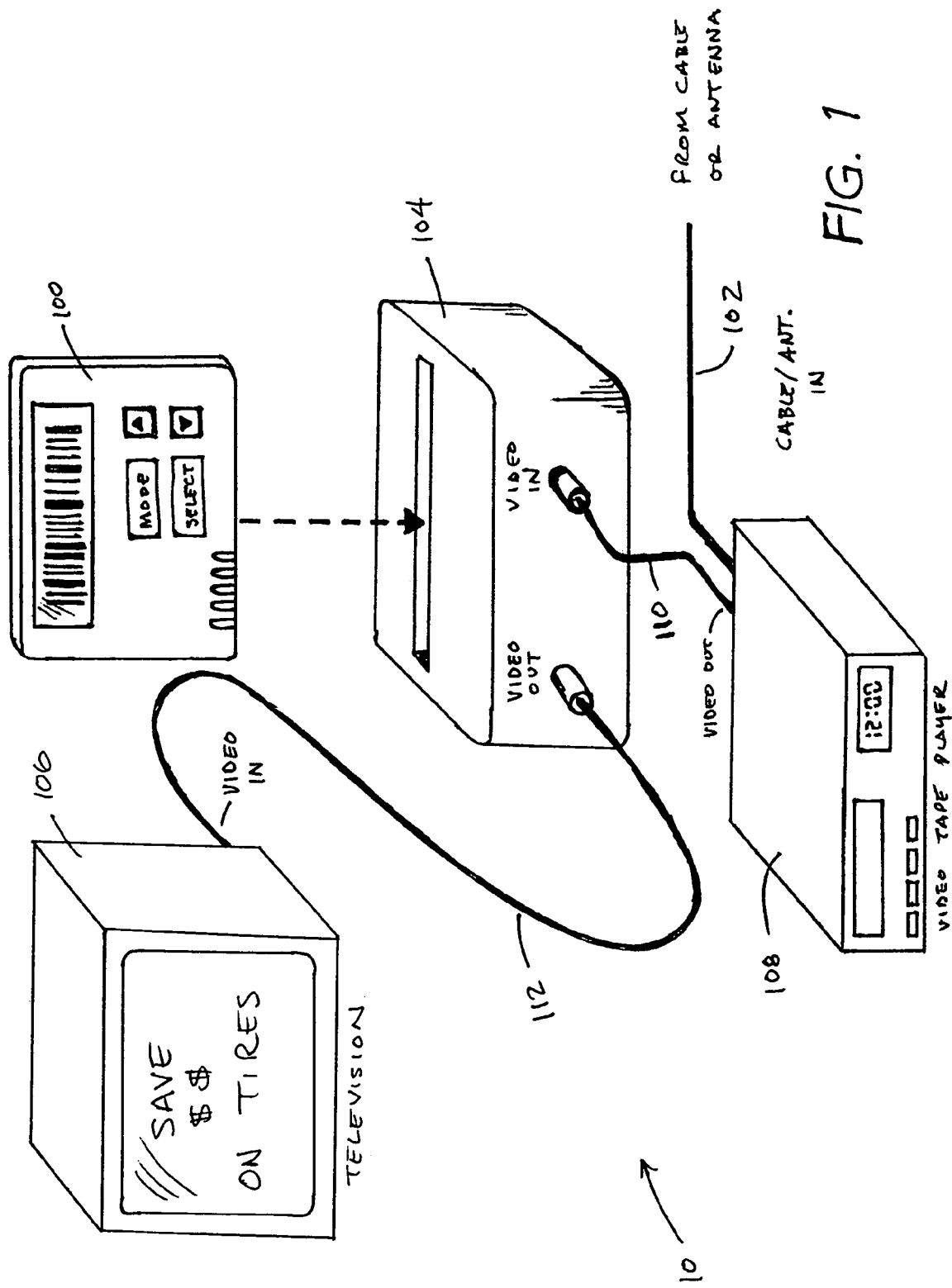
FIG. 1 is a graphical depiction of the primary components of a control system for delivering coupon data to an electronic coupon via the horizontal overscan portion of a video signal.

An exemplary embodiment of the present invention is a system and method for decoding and storing coupon data received via the horizontal overscan portion of a video signal. A method and system for encoding data into the horizontal overscan portion of a video signal is provided in a co-pending U.S. patent application Ser. No. 08/885,385, which is a continuation-in-part of U.S. patent application Ser. No. 08/795,710. Both of these applications are assigned to the Assignee of the present application, Microsoft Corporation, and both applications are hereby incorporated by reference. For the purposes of the following discussion, it is assumed that coupon data has been encoded into the horizontal overscan portion of a video signal.

The present invention may be deployed in a wireless or hard-wired communication environment that includes an electronic coupon and a decoder that extracts coupon data from a video signal and provides the coupon data to the electronic coupon. The electronic coupon may include a controller and a Liquid Crystal Display (LCD) display. The controller receives coupon data from the decoder and produces an output to the LCD display, in accordance with the coupon data received from the decoder and in accordance with the coupon pre-selection choices made by the consumer. The controller also can store the received coupon data in a non-volatile memory that is also part of the electronic coupon.

Coupon data can be transmitted from the decoder to the controller by many well-known means of data transmission. In an exemplary embodiment, the decoder has a socket with exposed electronic contacts into which the electronic coupon can be placed. Corresponding electronic contacts of the electronic coupon can receive the coupon data from the electronic contacts of the decoder. The electronic contacts of the electronic coupon are referred to as a receiver. The coupon data can be transmitted from the decoder to the receiver in discrete data words.

An Exemplary Electronic Coupon Data Delivery System

Referring now to the drawings, in which like numerals represent like elements throughout the several figures, aspects of the present invention and exemplary operating environments will be described.

FIG. 1 is a graphical depiction of the primary components of a control system for delivering coupon data to an electronic coupon via the horizontal overscan portion of a video signal. The environment includes a control system 10 that provides coupon data to an electronic coupon 100. An exemplary control system 10 includes a video signal source 102, a decoder 104, and a display device, such as television 106. The control system 10 transmits coupon data to the electronic coupon 100 via decoder 104. To accomplish this task, the decoder 104 interfaces with the video signal source 102 and the television 106 through a standard video interface. Over this standard video interface, the decoder 104 receives a video signal encoded with coupon data (encoded video) from the video signal source 102. The decoder 104 extracts the coupon data from the encoded video signal and then transfers the coupon data to the electronic coupon 100.

The control system may also have a video tape player 108. The video tape player 108 can also provide coupon data that is stored on a video tape played by the video tape player. The video tape player 108 can transmit an encoded video signal to the decoder 104 over a video out line 110 that can be directly connected to the decoder. When the control system is configured with a video tape player 108, as depicted, coupon data may be provided from either the video signal source 102 or the video tape player 108. This is advantageous, because it is desirable to provide coupon data both through televised programs (via the video signal source 102) and through taped programs (via the video tape player 108). When coupon data is provided via the video signal source 102, the encoded video signal will simply pass through the video tape player 108.

In either case, the video signal will be passed through the decoder 104 to the television 106, which will present the encoded video signal in the conventional manner. Thus, a user can observe the video presentation of, for example, a tire commercial, on the television 106 while the decoder 104 transmits, to the electronic coupon 100, coupon data relating to the commercial.

There is no need to modify the encoded video signal before passing it to the television 106. Typically, the decoder 104 receives the encoded video signal, which is a standard video signal that has been modified to include digital information (i.e., coupon data) in the horizontal overscan intervals of the scan lines, which are not displayed on the television 106. Thus, the television 106 can receive and display the encoded video signal without modification. The decoder 104 only needs to extract the coupon data from the encoded video signal and transmit the coupon data to the electronic coupon 100.

An Exemplary Electronic Coupon

Figure 2:
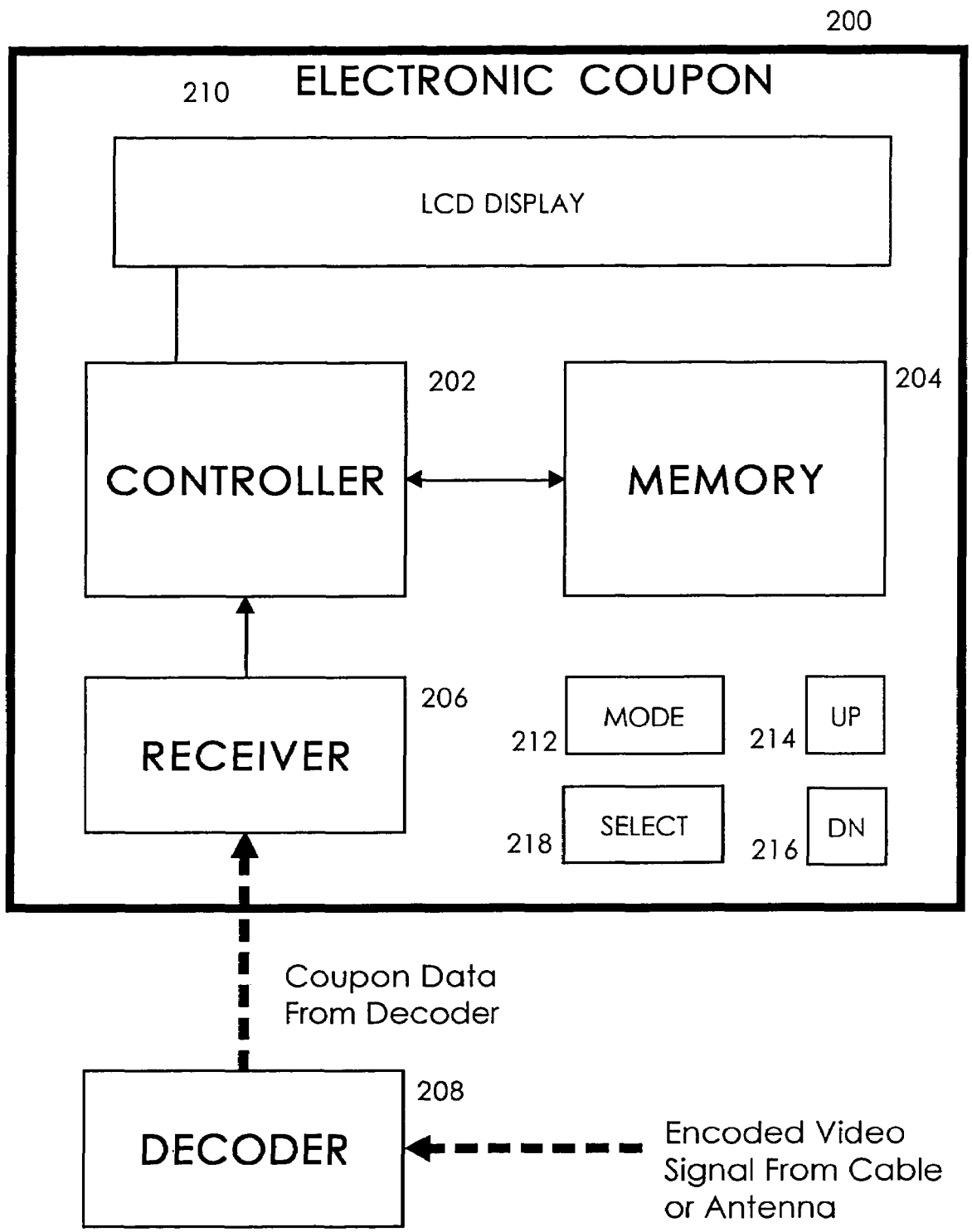
FIG. 2 is a block diagram illustrating the primary functional components of an exemplary electronic coupon.

FIG. 2 is a block diagram illustrating the primary functional components of an exemplary electronic coupon 200. Generally, the electronic coupon has three modes. In set-up mode, a user can scroll through a menu of product and services descriptions and select the displayed products and/or services for which the user would like to receive coupons. In storage mode, the electronic coupon receives and stores coupon data extracted from the video signal that comports with the user's selections made in set-up mode. In redeem mode, the electronic coupon displays the coupons that are stored in memory and displays the Universal Product Code (UPC) bar code for coupons selected to be redeemed.

In an exemplary embodiment of the electric coupon, a products/services menu could be stored in either a non-volatile memory 204 or in a Read Only Memory component (not shown) of the controller. In either case, the user can enter set-up mode (or any other mode) by pressing the MODE key 212 until the LCD display 210 indicates that the set-up mode is selected. When the set-up mode is selected on the LCD display 210, the user can press the SELECT key 218 to actually place the electronic coupon in set-up mode.

Once the electronic coupon is in set-up mode, then portions of the products/services menu can be displayed on the LCD display 210. Each entry in an exemplary products/services menu has a checkbox next to it so that the user can indicate whether the electronic coupon should store coupons for a particular good or service. Preferably, the user could scroll through the entire products/services menu using scroll keys 214, 216. When the user finds a product or service for which the user wants to receive and store a coupon, the user can indicate this by pressing the SELECT button 218 to mark the checkbox next to the product/service menu entry. Once the user has completed set-up mode, the electronic coupon will only store coupon data meeting the product/services selection requirements of the user.

In storage mode, the electronic coupon 200 receives coupon data in the form of data words from the decoder 208 by way of receiver 206. The receiver 206 then passes the coupon data to the controller 202. The controller 202 can either store the coupon data in memory 204 or can reject coupon data that does not meet the product/service selection requirements of the user. It will be appreciated by those skilled in the art that the non-volatile memory 204 could be implemented in the form of magnetic media (e.g., a storage disk), in the form of an electrical circuit (i.e., electronically), or by any other well-known means for storing data.

In an alternative embodiment, the decoder may be implemented as an integral part of the electronic coupon 200. The period during which coupon data is received by the electronic coupon 200 (whether via a broadcast or via video tape play-back) is referred to as the transmission session. While coupon data could be delivered during any transmission session, it is contemplated that advertisers will prefer to transmit coupon data during an advertisement of the product/service to which the coupon relates.

When the user places the electronic coupon in redeem mode, an exemplary embodiment of the electronic coupon provides a brief description of each coupon in memory on the LCD display 210. The user can scroll through the list of stored coupons using the scroll keys 214, 216. When the user finds a coupon that the user wishes to redeem, the user can press the SELECT key 218 and the electronic coupon will display on the LCD display 210, the UPC bar code for the selected coupon. Thus, the coupon can be read by a bar code scanner at, for example, a supermarket cash register.

In an exemplary embodiment, coupons may be deleted from the electronic coupon in redeem mode. This is advantageous, as the user may desire to remove a coupon from memory for various reasons. Because the memory capacity of the electronic coupon is finite, deleting coupons will be necessary at some point in order to save additional coupons. Additionally, it may be a requirement that a merchant delete a coupon that has been redeemed via an electronic coupon, in which case, the deletion of the coupon can be done by, for example, a supermarket cashier.

It will be appreciated that the LCD display 210 is merely an example of a means for redeeming a coupon stored in the electronic coupon 200. Other devices, such as a readable/writeable magnetic strip could be used for providing a representation of a coupon stored in memory.

An Exemplary Method for Receiving and Storing Coupon Data

Figure 3:
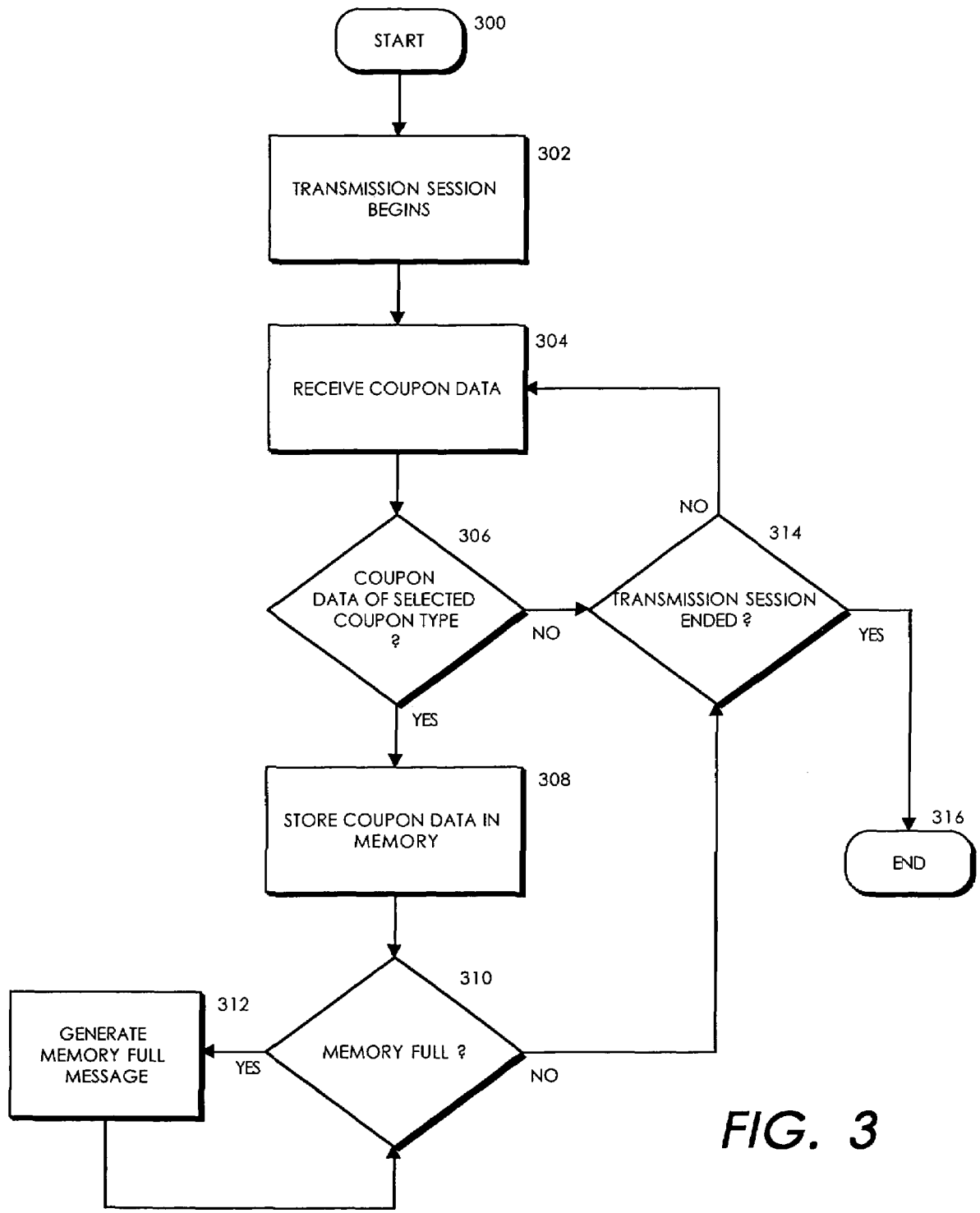
FIG. 3 is a flow chart that illustrates an exemplary method for downloading and storing coupon data in an electronic coupon during a transmission session.

FIG. 3 is a flow chart that illustrates an exemplary method for receiving and storing coupon data during a transmission session. The method starts at step 300 and proceeds to step 302, wherein the transmission session begins. The method then proceeds to step 304, wherein the electronic coupon receives coupon data from the decoder. The method then proceeds to decision block 306, wherein a determination is made as to whether the received coupon data matches a coupon-type selection made by the user in set-up mode.

If the coupon data matches the user's coupon-type selections, then the method branches to step 308, wherein the coupon data is stored in non-volatile memory. The method then proceeds to decision block 310, wherein a determination is made as to whether the electronic coupon memory is full. If the memory is not full, then the method branches back to decision block 314. If the memory is full, then the method branches to step 312, wherein a Memory Full message is generated. The method then proceeds back to decision block 310 and a loop will be maintained until the user deletes one or more coupons from memory.

Returning now to decision block 306, wherein a determination is made as to whether the received coupon data matches a coupon-type selection made by the user in set-up mode. If the coupon data does not match a coupon-type selection made by the user in set-up mode, then the method branches to decision block 314, wherein a decision is made as to whether the transmission session is over. If the transmission session is over, then the method branches to step 316 and the method ends. On the other hand, if the transmission session is not over, then the method branches to step 304 and more coupon data can be received.

Returning now to decision block 310, wherein a determination is made as to whether the memory is full. If the memory is not full, then the method branches to decision block 314, wherein a decision is made as to whether the transmission session is over. If the transmission session is over, then the method branches to step 316 and the method ends. On the other hand, if the transmission session is not over, then the method branches to step 304 and more coupon data can be received.

An Exemplary Method for Redeeming Coupon Data

Figure 4:
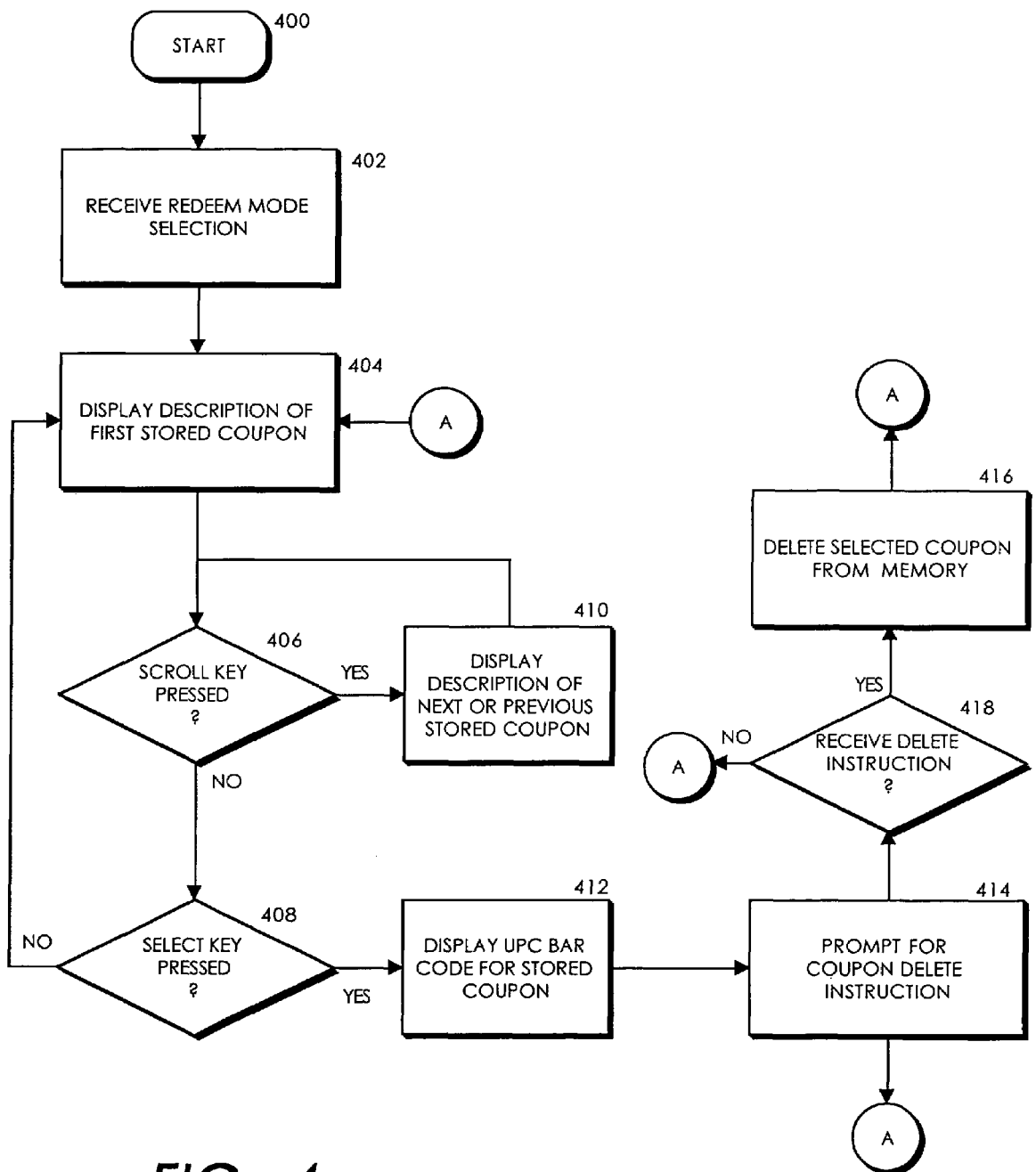
FIG. 4 is a flow chart that illustrates an exemplary method for redeeming coupons that are stored in an electronic coupon.

FIG. 4 is a flow chart that illustrates an exemplary method for redeeming coupons that are stored in an exemplary electronic coupon. The method starts at step 400 and proceeds to step 402 in which a redeem mode selection is received, indicating that the user intends to redeem at least one coupon. The method then proceeds to step 404, wherein the description of the first coupon in memory is displayed. The method then proceeds to decision block 406, wherein a determination is made as to whether a scroll key has been pressed. If a scroll key has been pressed, then the method branches to step 410, wherein the description of the next previous or next subsequent coupon memory is displayed. The method then branches back to decision block 406. If, at decision block 406, a determination is made that no scroll key is pressed, then the method branches to step 408, wherein a determination is made as to whether the SELECT key has been pressed. If the SELECT key has not been pressed, then the method branches back to step 404.

If a determination is made that the SELECT key has been pressed, then the method branches to step 412, wherein the UPC bar code is displayed that corresponds to the selected coupon. Preferably, the coupon will be redeemed at this point by, for example, a supermarket cashier, using a bar code reader. The method then branches to step 414, wherein the method prompts the user for authority to delete the coupon. The method then proceeds to decision block 418, wherein a determination is made as to whether the user has requested the deletion of the coupon. If the user requests that the coupon be deleted, then the method branches to step 416 and the coupon is deleted from memory. The method then branches to step 404. If, on the other hand, the user does not request that the coupon be deleted, then the method branches from decision block 418 to step 404.

The invention thus provides a method and system for decoding and storing encoded coupon data delivered via the horizontal overscan area of a video signal. An electronic coupon displays a UPC bar code corresponding to coupon data that can be encoded into a video signal that can be broadcast or played-back from video tape. The electronic coupon is equipped with a non-volatile memory that permits the coupon data to be stored for subsequent redemption.

It should be understood that the foregoing relates only to specific embodiments of the invention, and that numerous changes may be made therein without departing from the spirit and scope of the invention as defined by the following claims.

What is claimed is:

1. A system for selectively storing and selectively displaying coupons defined by coupon data extracted from a horizontal overscan portion of a video signal, the system comprising:

a decoder configured to receive a video signal during a transmission session and to extract coupon data from the horizontal overscan portion of the video signal producing extracted coupon data, the extracted coupon data defining a plurality of coupons relating to different products and services; and an electronic coupon configured to selectively store and to selectively display coupons defined by the extracted coupon data, the electronic coupon comprising:

a display configured to selectively display coupons defined by the extracted coupon data;

a plurality of control keys configured to selectively respond to actuation by a user;

a non-volatile memory configured to selectively store coupons defined by the extracted coupon data, and a controller configured to process the extracted coupon data produced by the decoder, the controller being logically coupled to the display, to the plurality of control keys, and to the non-volatile memory, the controller implementing the following functions:

enabling a user to selectively manipulate at least one of the of the plurality of control keys to select a setup mode prior to the transmission session, the controller responding to the selection of the setup mode by causing a menu including a plurality of different products and services to be presented to the user on the display;

enabling a user to manipulate at least one of the of the plurality of control keys to select at least one of the different products and services displayed in the menu, selection of a product or a service indicating that the user desires extracted coupon data corresponding to the product or the service selected to be stored in the electronic coupon; and automatically analyzing the extracted coupon data produced by the decoder, such that only coupons defined by the extracted coupon data that correspond to the at least one of the different products and services selected by the user in the setup mode are automatically stored in the non-volatile memory, and each coupon defined by the extracted coupon data that does not correspond to the at least one of the different products and services selected by the user in the setup mode is automatically discarded.

2. The system of claim 1, wherein the decoder is an integrated part of the electronic coupon, such that the decoder, the display, the at least one control key, the non-volatile memory, and the controller are encompassed in a common housing, the common housing being sufficiently portable that the electronic coupon is transportable to a retailer so that coupons stored thereon can be redeemed.

3. The system of claim 1, wherein the electronic coupon further comprises a Liquid Crystal Display (LCD) for displaying a selected coupon.

4. The system of claim 3, wherein the selected coupon is displayed as a Universal Product Code bar code.

5. The system of claim 4, wherein the Universal Product Code can be read by a bar code scanner.

6. The system of claim 1, wherein the transmission session comprises a broadcast of a television program.

7. The system of claim 6, wherein the television program comprises a television commercial.

8. The system of claim 1, wherein when the non-volatile memory in the electronic coupon is full, no additional extracted coupon data will be automatically stored until at least some previously extracted coupon data are deleted.

9. The system of claim 1, wherein at least one of the of the plurality of control keys comprises a mode key, the mode key being operative to select between a storage mode and a redeem mode, such that when in the storage mode, the controller analyzes extracted coupon data and saves each coupon corresponding to the products and the services selected by the user in the setup mode, and when in the redeem mode, the controller causes a menu of each coupon stored in the electronic coupon to be presented to the user on the display.

10. The system of claim 9, wherein the mode key is further operative to select the set-up mode.

11. The system of claim 1, wherein the non-volatile memory comprises magnetic media.

12. The system of claim 1, wherein the non-volatile memory comprises an electrical circuit.

13. A method for storing coupon data extracted from the horizontal overscan portion of a video signal in an electronic coupon, the method comprising the steps of:

providing an electronic coupon configured to selectively store coupons defined by coupon data extracted from the horizontal overscan portion of the video signal during a transmission session, the electronic coupon comprising a controller configured to analyze and manipulate the extracted coupon data;

before the transmission session, enabling a user to select a setup mode available in the electronic coupon by manipulating a key on the electronic coupon, the controller responding to selection of the setup mode by displaying a menu including a plurality of different products and services;

enabling the user to select at least one of the different products and services, selection of a product or a service indicating that the user desires extracted coupon data corresponding to the product or the service selected to be stored in the electronic coupon;

receiving the video signal during a transmission session;

extracting coupon data from the horizontal overscan portion of the video signal; and using the controller for automatically performing the steps of:

determining a product or a service corresponding to each coupon defined by the extracted coupon data;

storing each coupon defined by the extracted coupon data corresponding to a product or a service selected by the user, in the electronic coupon; and discarding each coupon defined by the extracted coupon data that does not correspond to a product or a service selected by the user.

14. The method of claim 13, wherein the transmission session comprises a broadcast of a television program.

15. The method of claim 13, wherein the transmission session comprises a play-back of a video taped program.

16. The method of claim 13, wherein the step of storing each coupon defined by the extracted coupon data corresponding to a product or a service selected by the user comprises the step of storing the coupon in a non-volatile memory in the electronic coupon.

17. The method of claim 13, further comprising the step of enabling a user to select a redeem mode available on the electronic coupon by manipulating a key on the electronic coupon, the controller responding to selection of the redeem mode by displaying a menu of stored coupons defined by the extracted coupon data corresponding to a product or a service selected by the user.

18. The method of claim 17, further comprising the step of enabling the user to select one of the stored coupons displayed in the menu of stored coupons, the controller responding to selection of one of the stored coupons by displaying the stored coupon.

19. The method of claim 13, further comprising the step of enabling the user to select a storage mode available in the electronic coupon by manipulating a key on the electronic coupon, the controller responding to selection of the storage mode by analyzing the extracted coupon data as the data are received by the electronic coupon.

20. The method of claim 18, wherein the coupon displayed comprises a Universal Product Code bar code.

21. The method of claim 20, wherein the coupon displayed can be read by a bar code scanner.

22. The method of claim 16, wherein the non-volatile memory comprises magnetic media.

23. The method of claim 16, wherein the non-volatile memory comprises an electrical circuit.

24. An electronic coupon for decoding and selectively storing coupon data that are encoded in a horizontal overscan portion of a video signal, the electronic coupon comprising:
- a decoder configured to receive the video signal, said decoder processing video signals thus received to decode coupon data that are encoded in the horizontal overscan portion of the video signal, producing decoded coupon data, the decoded coupon data defining at least one coupon;
- a display configured to selectively display coupons defined by the decoded coupon data;
- a plurality of control keys configured to be selectively controlled by a user;
- a memory in which selected coupons defined by the coupon data decoded by the decoder can be stored; and
- a processor configured to process the decoded coupon data produced by the decoder, the processor being logically coupled to the display, to the plurality of control keys, and to the memory, the processor implementing the following functions:
  - enabling a user to manipulate at least one of the of the plurality of control keys to select a setup mode prior to a transmission session, the controller responding to the selection of the setup mode by causing a menu including a plurality of different products and services to be presented to the user on the display, selection of a product or a service indicating that the user desires decoded coupon data corresponding to the product or the service selected to be stored in the electronic coupon;
  - enabling a user to manipulate least one of the of the plurality of control keys to select at least one of the different products and services displayed in the menu;
  - automatically analyzing the decoded coupon data produced by the decoder, such that only coupons defined by the decoded coupon data that correspond to a product or a service selected by the user in the setup mode are automatically stored in the memory, and each coupon defined by the decoded coupon data that does not correspond to a product or a service selected by the user in the setup mode is automatically discarded, the decoder, the display, the plurality of control keys, the memory, and the processor being encompassed in a common housing, the common housing being sufficiently portable that the electronic coupon is transportable to a retailer, where coupons stored therein are redeemable.

25. The system of claim 24, wherein the memory comprises magnetic media.

26. A system for decoding and selectively storing coupon data that are encoded in a horizontal overscan portion of a video signal, the system comprising:
- a decoder adapted to receive the video signal, said decoder processing video signals thus received to decode coupon data that are encoded in the horizontal overscan portion of the video signal the decoded coupon data defining at least one coupon;
- an electronic coupon comprising:
  - a receiver adapted to receive decoded coupon data from said decoder;
  - a memory for use in storing selected coupon data decoded by the decoder;
  - a display enabling a user to view the coupon data decoded by the decoder;
  - a plurality of control keys to selectively control a display of coupon data decoded by the decoder; and
  - a processor logically coupled to said receiver, to said memory, to said display, and to said plurality of control keys, said processor enabling a user to selectively manipulate the decoded coupon data received from the decoder by the receiver, said processor enabling a user to manipulate at least one of said plurality of control keys to select a set-up mode, such that when the set-up mode is selected, a user is presented with a menu comprising a plurality of different products and services that a user can select by manipulating at least one of said plurality of control keys, so that said processor automatically evaluates any decoded coupon data received by said receiver, such that decoded coupon data that correspond to a selected product or service are automatically stored in said memory, and decoded coupon data that do not correspond to a selected product or service are automatically not stored in said memory, selection of a product or service indicating that the user desires decoded coupon data corresponding to the product or the service selected to be stored in the electronic coupon.

27. A method for delivering and storing coupon data for an electronic coupon using the horizontal overscan portion of a video signal, the method comprising the steps of:
- providing an electronic coupon including a decoder configured to extract coupon data from the horizontal overscan portion of the video signal, such that the decoder and other functional components of the electronic coupon are encompassed in a common housing that is readily taken to a retailer to redeem a coupon stored in the electronic coupon;
- receiving the video signal at the electronic coupon during a transmission session;
- extracting coupon data from the horizontal overscan portion of a video signal using the decoder in the electronic coupon;
- storing the coupon data extracted by the decoder in the electronic coupon,
- taking the electronic coupon that includes the decoder to a retailer, to redeem a coupon stored in the electronic coupon; and
- displaying the electronic coupon to a retailer to redeem the electronic coupon.

28. A method for delivering and selectively storing coupon data using the horizontal overscan portion of a video signal, the method comprising the steps of:
- providing an electronic coupon comprising a plurality of keys configured to receive input from a user, the plurality of keys including a mode key operative to enable a user to toggle between a start up mode and a storage mode;
- actuating the mode key to selectively enter the start up mode, such that in response to selection of the start up mode, the electronic coupon automatically displays a menu including a plurality of products and services;
- enabling a user to select at least one product or service from the menu, selection of a product or a service indicating that the user desires coupon data corresponding to the product or the service selected to be stored in the electronic coupon;
- actuating the mode key to selectively enter the storage mode, such that in response to selection of the storage mode, the electronic coupon is enabled to automatically evaluate any coupon data extracted from the horizontal overscan portion of a video signal to determine if such coupon data correspond to a product or a service selected in the start up mode;

receiving the video signal;

extracting coupon data from the horizontal overscan portion of the video signal;

automatically evaluating the extracted coupon data with the electronic coupon; and if the extracted coupon data matches a selected product or service, then automatically storing the extracted coupon data, and otherwise, not storing the extracted coupon data.

29. A system for decoding and storing coupon data that are encoded in a horizontal overscan portion of a video signal, the system comprising:

a decoder adapted to receive the video signal, the decoder processing video signals thus received to extract coupon data that are encoded in the horizontal overscan portion of the video signal, the extracted coupon data defining a plurality of coupons, at least some of the coupons corresponding to different products and services;

an electronic coupon comprising:

a receiver configured to receive the plurality of coupons extracted by the decoder;

a memory configured to selectively store coupons received by the electronic controller;

a display enabling a user to selectively view a coupon stored in the memory;

a plurality of control keys configured to receive an input from a user, including a mode key enabling a user to selectively toggle between a setup mode, a storage mode, and a redeem mode; and a processor logically coupled to the receiver, to the memory, to the display, and to the plurality of control keys, the processor implementing at least the following functions:

responding to a user using the mode key to select the setup mode by displaying a menu including a plurality of different products and services to the user on the display;

enabling a user to manipulate at least one of the plurality of control keys to select at least one of the different products and services displayed in the menu in the setup mode, selection of a product or service indicating that the user desires coupons extracted by the decoder that correspond to the product or the service selected to be stored in the electronic coupon;

responding to a user using the mode key to select the storage mode by automatically analyzing each coupon defined by coupon data extracted from a video signal by the decoder and received by the electronic coupon, such that only coupons that correspond to a product or a service selected by the user in the setup mode are automatically stored in the memory, and each coupon that does not correspond to a product or a service selected by the user in the setup mode is automatically discarded; and responding to a user manipulating the mode key to select the redeem mode by displaying a menu including each coupon stored in the memory.

* * * * *